(12) United States Patent
Hauge et al.

(10) Patent No.: US 8,709,373 B2
(45) Date of Patent: Apr. 29, 2014

(54) STRONGLY BOUND CARBON NANOTUBE ARRAYS DIRECTLY GROWN ON SUBSTRATES AND METHODS FOR PRODUCTION THEREOF

(75) Inventors: Robert Hauge, Houston, TX (US); Cary Pint, Houston, TX (US); Noe Alvarez, Houston, TX (US); W. Carter Kittrell, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 13/139,418

(22) PCT Filed: Dec. 11, 2009

(86) PCT No.: PCT/US2009/067730
§ 371 (c)(1),
(2), (4) Date: Aug. 29, 2011

(87) PCT Pub. No.: WO2010/087903
PCT Pub. Date: Aug. 5, 2010

(65) Prior Publication Data
US 2011/0311427 A1 Dec. 22, 2011

Related U.S. Application Data

(60) Provisional application No. 61/121,609, filed on Dec. 11, 2008.

(51) Int. Cl.
*D01F 9/12* (2006.01)
(52) U.S. Cl.
USPC .................... 423/447.1; 423/447.3; 977/742; 977/843
(58) Field of Classification Search
USPC ........ 423/447.1–447.3, 445 B; 977/742–754, 977/842–848
See application file for complete search history.

(56) References Cited

U.S. PATENT DOCUMENTS 6,232,706 B1 * 5/2001 Dai et al. ...................... 313/309
6,538,367 B1   3/2003 Choi et al.
(Continued)

FOREIGN PATENT DOCUMENTS

WO   WO 2007/061078   *   5/2007   ............... B82B 3/00

OTHER PUBLICATIONS

Scholz, et al., Electrical conductivity of silicon carbide composites and fibers, Journal of Nuclear Materials 2002; 307-311: 1098-1101.*

(Continued)

*Primary Examiner* — Daniel C McCracken
(74) *Attorney, Agent, or Firm* — Winstead PC (57) ABSTRACT

The present disclosure describes carbon nanotube arrays having carbon nanotubes grown directly on a substrate and methods for making such carbon nanotube arrays. In various embodiments, the carbon nanotubes may be covalently bonded to the substrate by nanotube carbon-substrate covalent bonds. The present carbon nanotube arrays may be grown on substrates that are not typically conducive to carbon nanotube growth by conventional carbon nanotube growth methods. For example, the carbon nanotube arrays of the present disclosure may be grown on carbon substrates including carbon foil, carbon fibers and diamond. Methods for growing carbon nanotubes include a) providing a substrate, b) depositing a catalyst layer on the substrate, c) depositing an insulating layer on the catalyst layer, and d) growing carbon nanotubes on the substrate. Various uses for the carbon nanotube arrays are contemplated herein including, for example, electronic device and polymer composite applications.

9 Claims, 5 Drawing Sheets

(56) References Cited

U.S. PATENT DOCUMENTS

| | | |
|---|---|---|
| 6,843,850 B2 * | 1/2005 | Avouris et al. .................. 117/40 |
| 2006/0246438 A1 | 11/2006 | McCall et al. |
| 2009/0294753 A1 | 12/2009 | Hauge et al. |
| 2010/0021736 A1 | 1/2010 | Slinker et al. |
| 2010/0171409 A1 * | 7/2010 | Ando et al. .................. 313/311 |

OTHER PUBLICATIONS

Mathur, et al., Growth of carbon nanotubes on carbon fibre substrates to produce hybrid/phenolic composites with improved mechanical properties, Composites Science and Technology 2008; 68: 1608-1615.*

Chen, et al., Conductivity of carbon fiber reinforced cement-based composites, Cement & Concrete Composites 2004; 26: 291-297.*

Dai, et al., Single-wall nanotubes produced by metal-catalyzed disproportionation of carbon monoxide, Chemical Physics Letters 1996; 260: 471-475.*

Derycke, Catalyst-Free Growth of Ordered Single-Walled Carbon Nanotube Networks, Nano Letters 2002; 2(10): 1043-1046.*

Huang, et al., Growth Mechanism of Oriented Long Single Walled Carbon Nanotubes Using "Fast-Heating" Chemical Vapor Deposition Process, Nano Letters 2004; 4(6): 1025-1028.*

Pint, et al., Odako Growth of Dense Arrays of Single-Walled Carbon Nanotubes Attached to Carbon Surfaces, Nano Res 2009; 2: 526-534.*

Zhu, et al., A seamless three-dimensional carbon nanotube graphene hybrid material, Nature Communications 2012; 3(1225): 1-7.*

International Search Report and Written Opinion for PCT/US2009/67730 dated Mar. 29, 2010.

* cited by examiner

STRONGLY BOUND CARBON NANOTUBE ARRAYS DIRECTLY GROWN ON SUBSTRATES AND METHODS FOR PRODUCTION THEREOF

CROSS-REFERENCE TO RELATED APPLICATIONS

This application claims priority to U.S. provisional patent application 61/121,609, filed Dec. 11, 2008, which is incorporated by reference herein in its entirety.

STATEMENT REGARDING FEDERALLY SPONSORED RESEARCH

This invention was made with Government support under Grant Number FA8650-05-D-5807, awarded by the U.S. Department of Defense. The Government has certain rights in the invention.

BACKGROUND

The discovery that carbon nanotubes can be grown in dense, aligned arrays has inspired the conceptualization of their use in a number of unique applications. For example, aligned carbon nanotube arrays have been proposed for use in supercapacitors, field emitters, transparent and aligned conductive films, adhesive tapes, membrane filters, and speaker devices.

Although aligned carbon nanotube arrays have drawn significant research interest, there exists a potential drawback for their implementation in the above applications and others. Conventionally-prepared carbon nanotube arrays are prepared by depositing a thin, insulating oxide layer upon a substrate, followed by deposition of a catalyst layer upon the oxide layer. The oxide layer supports the catalyst, maintains its activity and promotes the growth of carbon nanotubes. The general requirement of an intervening oxide layer between the substrate and the catalyst prevents the carbon nanotubes from becoming bonded directly to the substrate. Although simple techniques have been developed to transfer aligned carbon nanotubes from a growth substrate to a desired substrate, direct growth on a desired substrate would be a far more efficient process.

Furthermore, the oxide layer is not compatible with a number of substrates, so there is a process limitation on the types of substrates upon which carbon nanotubes can be grown. As a result, for a number of interesting substrates, direct carbon nanotube growth is not possible by conventional growth processes. For example, direct growth of dense arrays of carbon nanotubes on a carbon surface (e.g., graphite, carbon fibers or foil, or diamond) or a conducting surface such as, for example, a metal is not possible by conventional growth methods. Carbon fibers are a substrate of particular interest due to their well-established use in the aerospace and polymer composite industries. Direct growth of carbon nanotubes on carbon surfaces according to conventional growth methods typically results in low carbon nanotube yields, sparse growth and potential damage to the carbon surface by the catalyst.

In view of the foregoing, methods for direct growth of carbon nanotubes on a substrate in the absence of an intervening oxide layer would be desirable in the art. Such direct growth methods would facilitate production of carbon nanotube arrays having the carbon nanotubes strongly bound to the substrate. Furthermore, such direct growth methods would also advantageously facilitate growth on non-conventional substrates such as, for example, carbon substrates and metal substrates, which are of interest in a number of potential carbon nanotube applications.

SUMMARY

In various embodiments, carbon nanotube arrays are described herein. The carbon nanotube arrays include a substrate and carbon nanotubes grown on the substrate. The carbon nanotubes are covalently bonded to the substrate by a plurality of nanotube carbon-substrate covalent bonds. In some embodiments, the arrays may be included in an electronic device or a polymer composite.

In other various embodiments, carbon nanotube arrays include a carbon substrate and carbon nanotubes grown on the carbon substrate. The carbon substrate may be, for example, a carbon foil, carbon fibers or diamond.

In still other various embodiments, methods for growing carbon nanotubes are described herein. The methods include providing a substrate, depositing a catalyst layer on the substrate, depositing an insulating layer on the catalyst layer and growing carbon nanotubes on the substrate.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 3A shows the Al 2p XPS spectrum; FIG. 3B shows the Fe $2p_{3/2}$ XPS spectrum;

FIGS. 4A and 4B show illustrative Raman spectra of a carbon nanotube array; FIG. 4A shows the D and G bands of the carbon nanotubes; FIG. 4B shows the radial breathing modes of the carbon nanotubes;

DETAILED DESCRIPTION

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

As used herein, the term "multi-wall carbon nanotubes" will refer to carbon nanotubes having more than one wall. According to the present definition of multi-wall carbon nanotubes, double- and triple-wall carbon nanotubes will be considered to be multi-wall carbon nanotubes.

As used herein, the term "carbon nanotube array" will refer to an assembly of carbon nanotubes attached to a substrate.

As used herein, the term "catalyst" will refer to a substance capable of catalyzing the formation of carbon nanotubes.

Aligned carbon nanotube arrays have been actively pursued by a number of researchers in order to take advantage of the desirable mechanical properties of these materials. Alignment generally enhances the electrical, thermal and mechanical properties of the carbon nanotubes relative to their unaligned counterparts. Aligned carbon nanotube arrays are conventionally prepared by coating a growth substrate (e.g., a silicon wafer) with a thin insulating layer of alumina (~10 nm), followed by coating of the alumina layer with a thin Fe catalyst layer (~0.5 nm). Upon reduction of the Fe catalyst layer, the Fe typically breaks apart to form point sources of high density nucleation sites operable for forming carbon nanotubes in the presence of a feedstock gas (e.g., $C_2H_2$, $C_2H_4$, $CH_4$). In this well-established growth technique, the catalyst is supported by the alumina layer and resides at the base of the growing carbon nanotube array next to the substrate. The catalyst particles absorb carbon from the gas phase and provide it at the particle interface to form the growing carbon nanotubes. As a result, bonding to the substrate occurs through the metal catalyst particle. This type of carbon-metal bond is air sensitive and breaks upon exposure to air. Therefore, conventionally-prepared carbon nanotube arrays are easily detached from their growth substrate.

Embodiments of the present disclosure are distinguished over existing carbon nanotube growth methods in that the catalyst layer is deposited directly on a substrate, and the catalyst layer is then overcoated with an insulating layer. Embodiments of the present disclosure are advantageous over conventional carbon nanotube growth methods in facilitating carbon nanotube growth on substrates that do not support conventional growth techniques. Furthermore, the growth techniques of the present disclosure are advantageous in forming carbon nanotube arrays in which the carbon nanotubes are strongly bound to the substrate.

Figure 1:
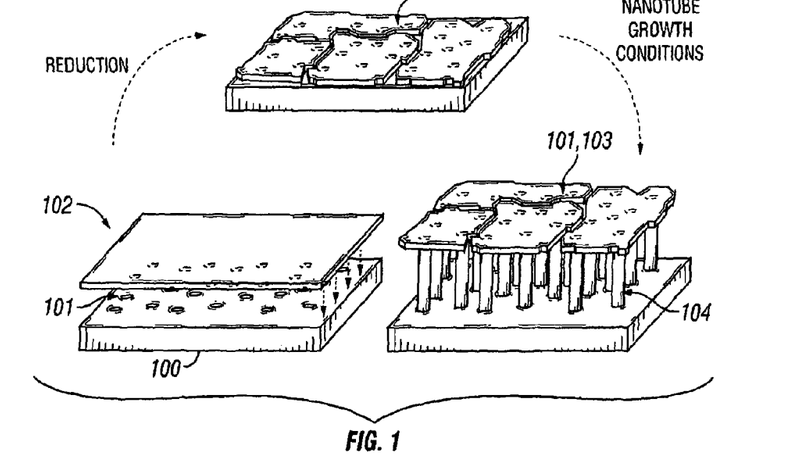
FIG. 1 shows an illustrative schematic demonstrating the growth of a carbon nanotube array in which a catalyst layer is directly deposited on a substrate, with an insulating layer deposited on the catalyst layer.

FIG. 1 shows an illustrative schematic demonstrating the growth of a carbon nanotube array in which a catalyst layer is directly deposited on a substrate, with an insulating layer deposited on the catalyst layer. As shown in FIG. 1, a substrate 100 is coated with a catalyst layer 101, which is then overcoated with an insulating layer 102 of alumina. The catalyst layer 101 may be a discontinuous layer containing small, discrete catalyst particles, as shown in FIG. 1, or it may be a continuous layer in an embodiment. Upon heating in a reducing atmosphere to activate the catalyst layer 101, the insulating layer 102 also cracks to produce a cracked insulating layer 103, thereby exposing the catalyst layer 101. After reduction, exposure to carbon nanotube growth conditions results in growth of carbon nanotubes 104 between substrate 100 and cracked insulating layer 103. In the process of growing carbon nanotubes 104, the cracked insulating layer 103 and the catalyst layer 101 separate from the substrate 100 to accommodate the growth of the carbon nanotubes 104.

The cracked insulating layer 103 is generally in flake form after separating from substrate 100, and each flake generally contains many thousands of catalyst particles on the underside of the flake. As a result, in an embodiment, carbon nanotubes 104 become directly bound to the substrate 100, and further growth and lengthening of the carbon nanotubes 104 is supported by the catalyst particles on the underside of the insulating layer flakes. Prior to breaking away from the substrate 100, the catalyst layer 101 contacts the substrate surface. While in contact with the substrate 100, the catalyst layer 101 can catalyze the formation of carbon-substrate bonds to covalently bond the growing carbon nanotubes 104 to the substrate. After breaking away from substrate 100, however, the catalyst contributes to the lengthening of the covalently bound carbon nanotubes. The strong bonding between the carbon nanotubes 104 and substrate 100 further distinguishes the carbon nanotube arrays of the present disclosure over those prepared by conventional carbon nanotube growth methods.

In various embodiments, carbon nanotube arrays are described herein. The carbon nanotube arrays include a substrate and carbon nanotubes grown on the substrate. The carbon nanotubes are covalently bonded to the substrate by a plurality of nanotube carbon-substrate covalent bonds. In some embodiments, the carbon nanotubes are aligned in the arrays.

The substrates upon which the carbon nanotube arrays may be grown are not particularly limited. In fact, the embodiments described in the present disclosure allow carbon nanotube arrays to be grown on a far wider range of substrates than is possible using conventional carbon nanotube growth techniques. In some embodiments, the substrate is an electrical conductor. In some embodiments, the substrate is a carbon substrate such as, for example, a carbon foil, carbon fibers, diamond or nano-diamond. Carbon foils include, for example, GRAFOIL, a flexible graphite foil commonly used in making gaskets. In some embodiments, the substrate may include, for example, carbon, carbon fibers, carbon foil, graphite, diamond, nano-diamond, diamond-like carbon, glassy carbon, silicon, quartz, silicon carbide, non-metal carbides, metal carbides, binary carbides and metals. In various embodiments, the substrate may be a metal such as, for example, copper, stainless steel, tantalum or molybdenum. Other metal substrates also lie within the spirit and scope of the present disclosure.

In some embodiments, carbon nanotube arrays of the present disclosure include a carbon substrate and carbon nanotubes grown on the carbon substrate. The carbon substrate may be, for example, a carbon foil, carbon fibers, or diamond.

In various embodiments of the present disclosure, there is no catalyst immobilized on the substrate. In contrast, conventionally-grown carbon nanotube arrays have a non-mobile catalyst secured to the substrate through an intervening oxide layer (e.g., alumina).

The carbon nanotube arrays of the present disclosure are advantageous over those prepared by conventional carbon nanotube growth methods in that the carbon nanotubes are strongly bound to the substrate. In an embodiment, the carbon nanotubes are directly grown on the substrate and are covalently bonded to the substrate by a plurality of nanotube carbon-substrate covalent bonds. The nanotube carbons may be bonded by $sp^3$ or $sp^2$ bonding in an embodiment. The carbon nanotube arrays of the present disclosure are grown without an intervening oxide layer supporting a metal catalyst, which permits the direct growth on the substrate and strong bonding to occur.

In some embodiments of the present disclosure, the carbon nanotube arrays include single-wall carbon nanotubes. In other embodiments, the carbon nanotube arrays include a mixture of single-wall carbon nanotubes and multi-wall carbon nanotubes. In various embodiments, the carbon nanotubes have diameters ranging between about 0.7 nm and about 6 nm. In some embodiments, the carbon nanotubes have diameters less than about 3 nm. In some embodiments, the carbon nanotubes have a diameter distribution range centered at about 3.1 nm.

In other various embodiments, methods for growing carbon nanotubes are described herein. The methods include providing a substrate, depositing a catalyst layer on the substrate, depositing an insulating layer on the catalyst layer and growing carbon nanotubes on the substrate.

In various embodiments, the catalyst layer includes a metal, such as, for example, a low-valent or zero-valent metal. Such metal catalysts for forming carbon nanotubes are well known to those of ordinary skill in the art. In some embodiments, the methods further include reducing the catalyst layer. Reduction of the catalyst layer may produce a low-valent or zero-valent metal in the catalyst layer. In some embodiments, the reduction is conducted with hydrogen. In some embodiments, the reduction takes place at a temperature greater than about 2000° C.

In some embodiments, the metal of the catalyst layer may be, for example, iron, nickel, cobalt, or combinations thereof Variations in catalyst composition and density may be performed by alloying various metals together. Such alloyed catalysts may not only influence the properties of the carbon nanotubes grown, but also affect the interaction of the insulating layer with the substrate and the catalyst layer and dictate the ease with which it detaches from the substrate.

In some embodiments, the catalyst layer is deposited by electron beam deposition. As electron beam deposition is a line-of-sight deposition technique, electron beam deposition is typically used for coating a single side of a substrate with a catalyst layer. However, by simply flipping or rotating the substrate after an initial deposition, subsequent depositions by electron beam deposition may be performed as many times as desired.

In some embodiments, the catalyst layer is deposited by atomic layer deposition. Atomic layer deposition is advantageous in being a three-dimensional deposition technique. Furthermore, with atomic layer deposition, pre-made catalyst particles may be spin coated on to a substrate without a separate catalyst reduction step being performed after deposition. In still other various embodiments, the catalyst layer may be deposited by a dip coating technique.

In various embodiments, the catalyst layer is discontinuous. In embodiments having a discontinuous catalyst layer, catalyst deposition results in the formation of small catalyst or catalyst precursor particles during the deposition step as a result of the balance between catalyst-surface interfacial interactions relative to intra-particle atomic interactions. In other words, an initially deposited catalyst layer may coalesce into discrete catalyst particles due to the energetics of particle interaction. In embodiments having a discontinuous catalyst layer, the insulating layer may contact both the catalyst layer and the substrate.

In various embodiments, the catalyst layer is between about 1 nm and about 5 nm in thickness. In other various embodiments, the catalyst layer is between about 0.5 nm and about 5 nm in thickness. In still other various embodiments, the catalyst layer is between about 0.5 nm and about 3 nm in thickness. In some embodiments, the catalyst layer is between about 2 nm and about 5 nm in thickness. In some embodiments, the catalyst layer is less than about 2 nm in thickness.

In some embodiments, growing of carbon nanotubes takes place by chemical vapor deposition. In some embodiments of the methods, the carbon nanotubes are single-wall carbon nanotubes. However, in other embodiments of the methods, a mixture of single-wall carbon nanotubes and multi-wall carbon nanotubes may be produced. In general, single-wall carbon nanotubes are grown by flowing 400 standard cubic centimeters per minute (sccm) of $H_2$, 2 sccm $H_2O$ and 2 sccm $C_2H_2$ through a reaction zone held at 750° C. and 1.4 torr. One of ordinary skill in the art will recognize that these reaction conditions are intended to be illustrative, and routine variation of the composition, flow rates, pressure and temperature may be conducted to achieve an identical or like result. At higher pressures (e.g., 25 torr), a mixture of single-wall carbon nanotubes and multi-wall carbon nanotubes may be produced in an embodiment. Higher pressures also generally result in faster carbon nanotube growth rates.

In various embodiments, the insulating layer is a metal oxide or non-metal oxide. In some embodiments, the insulating layer is alumina. In some embodiments, the insulating layer is silicon oxide. In some embodiments, the insulating layer is magnesium oxide. In some embodiments, the insulating layer is between about 1 nm and about 100 nm in thickness. In other embodiments, the insulating layer is between about 1 nm and about 50 nm in thickness. In still other embodiments, the insulating layer is between about 5 nm and about 50 nm in thickness. In still other embodiments, the insulating layer is between about 1 nm and about 40 nm in thickness.

In some embodiments of the methods, the catalyst layer and the insulating layer detach from the substrate during growing the carbon nanotubes. Accordingly, in some embodiments, the carbon nanotubes are between the substrate and the insulating layer after the insulating layer detaches from the substrate. In certain embodiments, the carbon nanotubes between the substrate and the insulating layer are covalently bonded to the substrate.

In some embodiments of the methods, the carbon nanotubes are covalently bonded to the substrate. For example, in some embodiments, the carbon nanotubes are covalently bonded to the substrate by a plurality of nanotube carbon-substrate covalent bonds. In embodiments where the substrate is a carbon substrate, nanotube carbon-substrate carbon covalent bonds are formed, and when the substrate is a metal, nanotube carbon-substrate metal covalent bonds are formed. Bonding to the nanotube carbons may be of either the $sp^3$ or $sp^2$ type in various embodiments.

In various embodiments, the carbon nanotube arrays of the present disclosure may be included in polymer composites. Aligned carbon nanotube arrays strongly bound to a substrate surface may allow for a high surface area adhesion layer to be formed in such polymer composites. Accordingly, polymer composites employing the carbon nanotube arrays of the present disclosure may efficiently transfer an applied load to the substrate due to the strong bonding between the carbon nanotubes and the substrate, thereby strengthening the polymer composites. For example, carbon fibers coated with covalently-bound carbon nanotubes, as described in the embodiments herein, may more efficiently strengthen a polymer composite than either uncoated carbon fibers alone or carbon fibers coated with covalently-bound carbon nanotubes prepared by other methods that do not contain a nanotube carbon-carbon fiber carbon covalent bond. Strengthening of the polymer composites may occur, for example, due to the significant increase in surface area of the carbon fibers that occurs upon their being coated with the covalently-bound carbon nanotubes.

In other various embodiments, the carbon nanotube arrays of the present disclosure may be included in electronic devices. Electronic devices include, for example, supercapacitors, field emitters, high power transistors and conductive films. In some embodiments, the carbon nanotube arrays included in the electronic devices may be grown on an electrically-conducting metal substrate. In such embodiments, the carbon nanotubes may form nanotube carbon-metal bonds to the substrate, ensuring a good electrical contact between the carbon nanotubes and the electrically-conducting metal substrate. The carbon nanotube arrays are advantageous in bonding the carbon nanotubes directly to the substrate without needing to further functionalize the carbon nanotubes, which may maintain the carbon nanotubes' desirable electrical conductivity. In conventionally grown carbon nanotube arrays, the presence of an insulating layer between the carbon nanotubes and the substrate eliminates the possibility of making direct electrical contact between the carbon nanotubes and an electrically conducting substrate. In the present carbon nanotube array embodiments, however, electrical contact between the electrically-conducting metal substrate and electrically-conducting carbon nanotubes is facilitated by the presence of a covalent bond between the two. Furthermore, the carbon nanotube arrays described herein are advantageous in electronic device applications because no further processing or transfer of the carbon nanotubes is necessary.

EXPERIMENTAL EXAMPLES

The following examples are provided to more fully illustrate some of the embodiments disclosed hereinabove. It should be appreciated by those of ordinary skill in the art that the techniques disclosed in the examples that follow represents techniques that constitute illustrative modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example 1

Catalyst Deposition and Carbon Nanotube Growth on a Carbon Foil

A catalyst layer (Fe) 1 nm in thickness was deposited directly on the carbon foil surface via electron beam deposition. Directly following the deposition of the catalyst layer, an insulating overlayer of alumina ($Al_2O_3$) 5 nm in thickness was deposited on the catalyst layer. Imaging of the catalyst layer showed that instead of a continuous catalyst layer being formed, a discontinuous layer of discrete catalyst particles was instead formed, likely due to the balance of catalyst-substrate interfacial interactions compared to intra-particle atomic interactions. As a result, the insulating overlayer of alumina interacted not only with the discontinuous catalyst layer, but also the substrate.

Carbon nanotube growth was performed on the above substrate using low-pressure (1.4 torr) water-assisted growth conditions with atomic hydrogen catalyst activation. In brief, the catalyst- and alumina-coated substrate was exposed to atomic hydrogen via a tungsten hot filament (30 s in the presence of $H_2$) prior to rapid insertion into a pre-heated furnace. Single-wall carbon nanotube arrays were grown at a flow rate of 400 standard cubic centimeters per minute (sccm) $H_2$, 2 sccm $H_2O$, and 2 sccm $C_2H_2$ at a temperature of 750° C. At an elevated growth pressure of 25 Torr, the growth rate was increased, but some multi-wall carbon nanotubes were formed in the array. At the lower pressure conditions favoring growth of single-wall carbon nanotubes, carbon nanotubes of about 100 μm in length and greater were routinely produced.

Upon rapid insertion into the hot furnace, the alumina overlayer cracked into small flakes. As a result, the catalyst layer was exposed to the feedstock gases at the exposed edges of the cracked alumina overlayer. During carbon nanotube growth, the alumina overlayer detached from the substrate due to the instability of the alumina-carbon interface (C—O bond) in the presence of hydrogen, taking the catalyst layer with it. Single-wall carbon nanotube nucleation likely occurred while the catalyst layer was still at the carbon surface, leaving the first carbon deposits "molded" by the carbon surface and likely allowing some carbon-carbon covalent bond formation to occur between the growing single-wall carbon nanotubes and the carbon surface. After detachment of the alumina overlayer, the catalyst layer was carried along with the alumina flakes, and carbon nanotube growth and lengthening was supported by the mobile catalyst particles supported on the alumina flakes.

Example 2

Characterization of the Carbon Nanotube Arrays Grown on a Carbon Foil

Figure 2A:
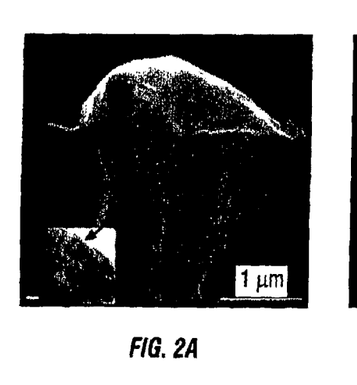
FIG. 2A shows an illustrative SEM image of an alumina flake tethered to carbon nanotubes during carbon nanotube growth conditions.
Figure 2B:
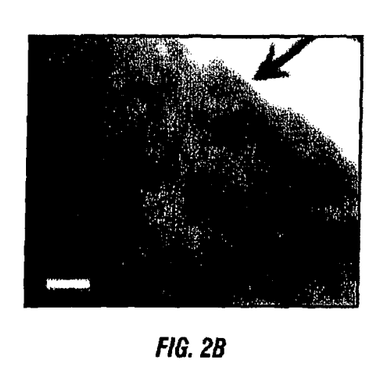
FIG. 2B shows a high-magnification SEM image of the alumina flake showing catalyst particles on its underside after detachment.

FIG. 2A shows an illustrative SEM image of an alumina flake tethered to carbon nanotubes during carbon nanotube growth conditions. FIG. 2B shows a high-magnification SEM image of the alumina flake showing catalyst particles on its underside after detachment. The alumina flakes are optically transparent up to at least 40 nm in thickness, which allows imaging of the catalyst particles on the underside of the flake to take place.

Figure 3A:
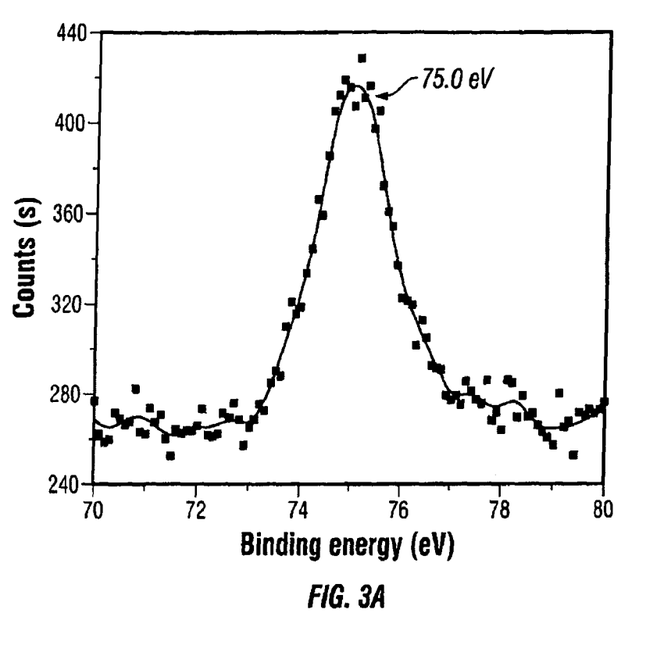
FIGS. 3A and 3B show illustrative XPS spectra of the surface of a carbon nanotube array having a thickness of about 30 µm.
Figure 3B:
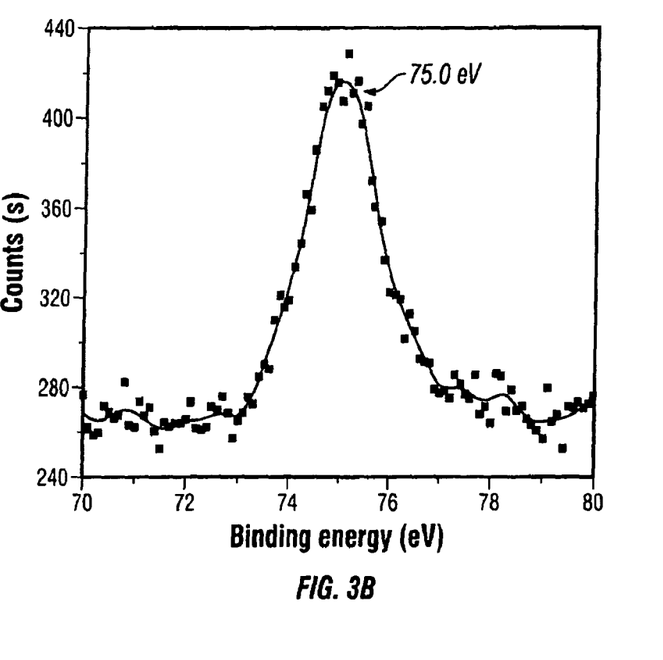

FIGS. 3A and 3B show illustrative XPS spectra of the surface of a carbon nanotube array having a thickness of about 30 μm. FIG. 3A shows the Al 2p XPS spectrum. FIG. 3B shows the Fe $2p_{3/2}$ XPS spectrum. Since the penetration depth of electrons in XPS is about 10 nm from the surface, the fact the both Al and Fe are detected by XPS further demonstrates that both the alumina and the Fe catalyst are detached from the substrate surface during carbon nanotube growth. The Fe XPS signal strength indicated that at least a substantial amount of the Fe catalyst was detached from the substrate surface.

Evidence that the carbon nanotubes were covalently bound to the carbon substrate was provided by employing techniques that are typically used to transfer carbon nanotube arrays from a host surface to a desired substrate. For example, carbon nanotubes grown according to conventional growth techniques may be easily detached from a host surface by contact with an adhesive (Scotch tape method). However, when a dense carbon nanotube array containing no exposed carbon substrate surface was contacted with an adhesive, removal of the adhesive not only detached the carbon nanotubes from the substrate but also removed layers of the carbon substrate as well. Such substrate layer removal does not occur in conventionally-grown carbon nanotube arrays. Furthermore, when the carbon nanotube array surface was wetted with ethanol solvent and dried, capillary force-induced drying of the carbon nanotubes did not appear to disturb the interaction between the carbon nanotubes and the carbon substrate surface. Although carbon nanotube fibril densification and mechanical stress were increased upon solvent removal, the unchanged interaction between the carbon nanotubes and the carbon substrate surface is indicative of a strong bond between the two.

Figure 4A:
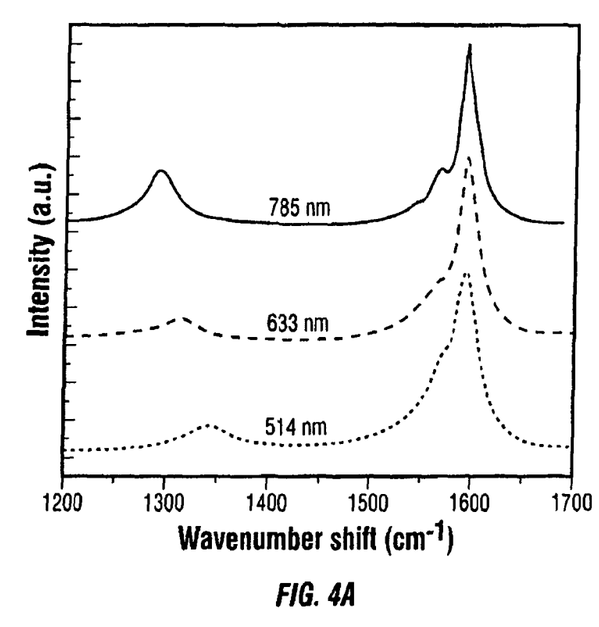
Figure 4B:
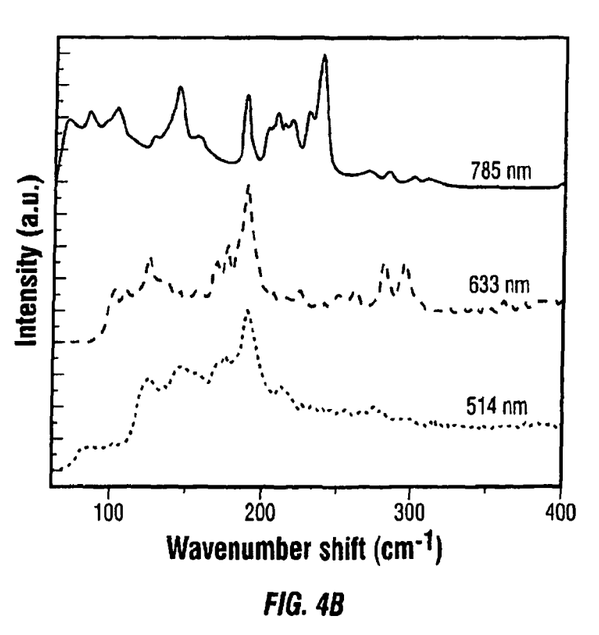

FIGS. 4A and 4B show illustrative Raman spectra of a carbon nanotube array. FIG. 4A shows the D and G bands of the carbon nanotubes. FIG. 4B shows the radial breathing modes of the carbon nanotubes. The Raman spectroscopy data showed a relatively low intensity of the D band with respect to that of the G band that is typically evident during SWNT growth (see FIG. 4A). The G/D ratio was ~7 at 514 nm excitation, ~10.8 at 633 run excitation, and ~3.5 at 785 nm excitation. The higher D-band intensity at the lower excitation energy is likely due to the presence of some amorphous carbon in the arrays.

In addition to the G/D ratio, the broad range of diameter-dependent radial breathing modes (RBM) at all three excitation energies demonstrated a wide diameter distribution of single-wall carbon nanotubes (see FIG. 4B). In particular, the lowest energy excitations indicated the presence of a family of $E_{11}$ metallic SWNT transitions (~150 cm$^{-1}$), and a broad range of $E_{11}$ and $E_{22}$ semiconducting single-wall carbon nanotube transitions (60-130 cm$^{-1}$) that emphasize the presence diameters greater than 3 nm. Also present was a family of small-diameter single-wall carbon nanotubes having diameters <1.5 nm, as evidenced by RBM at frequencies greater than 190 cm$^{-1}$. Furthermore, excitation at 633 nm (1.96 eV) indicated the presence of some very small diameter single-wall carbon nanotubes having diameters <0.9 nm.

Figure 5:
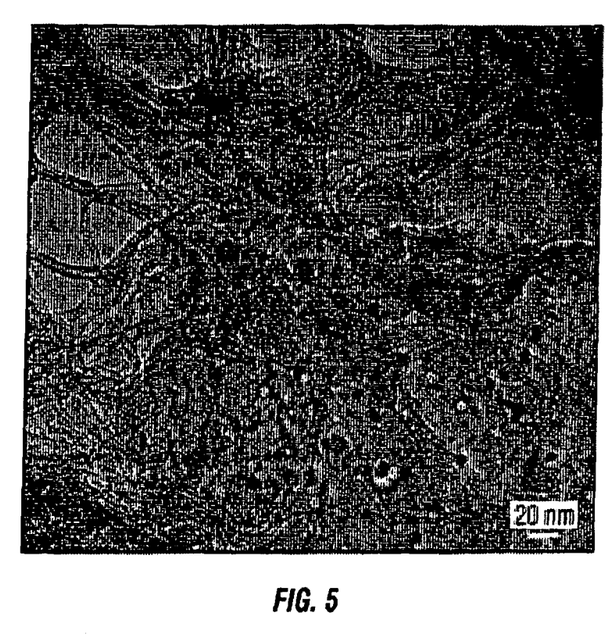
FIG. 5 shows an illustrative TEM image of a carbon nanotube array.
Figure 6:
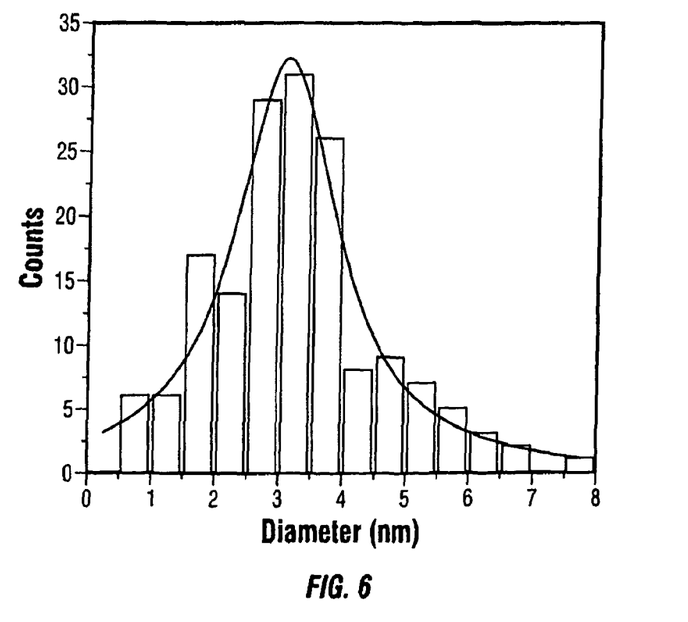
FIG. 6 shows a histogram demonstrating an illustrative carbon nanotube diameter distribution in a carbon nanotube array.

FIG. 5 shows an illustrative TEM image of a carbon nanotube array. TEM imaging confirmed the general description of carbon nanotube diameter distribution as indicated above by Raman spectroscopy. TEM samples were prepared by bath sonication of the carbon nanotubes in ethanol for 15 minutes, and then the samples were drop dried on to a TEM grid. Analysis of the TEM image confirmed the presence of a slight majority of fairly large diameter (2-4 nm) single-wall carbon nanotubes, with smaller proportions of smaller (1-2 nm) and larger (4-6 nm) diameters as well. FIG. 6 shows a histogram demonstrating an illustrative carbon nanotube diameter distribution in a carbon nanotube array. It should be noted that the smaller diameter single-wall carbon nanotubes were consistently bundled in the TEM images, resulting in difficulty in identifying them amidst their larger diameter counterparts that remained unbundled. Although the estimated diameter distribution could be significantly impacted by the bundling of small-diameter carbon nanotubes, the histogram of carbon nanotube diameters nonetheless appeared to approximately fit a Lorentzian distribution having a peak center at ~3.1 nm. This diameter distribution is similar to that obtained by conventional carbon nanotube growth methods.

Example 3

Carbon Nanotube Growth on Carbon Fibers

Figure 7A:
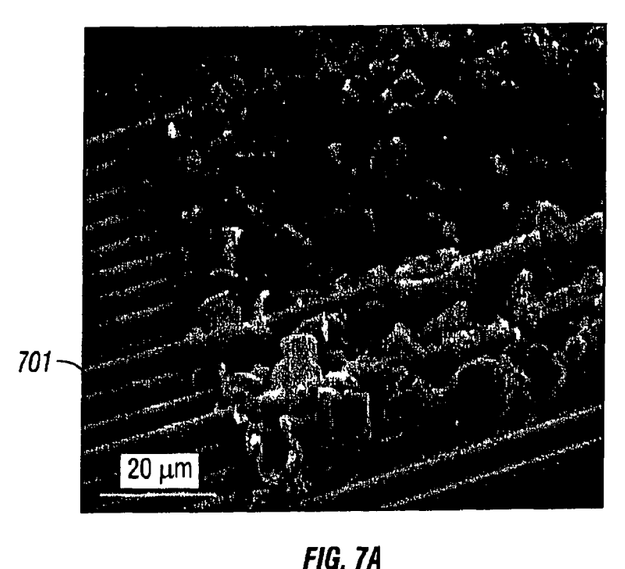
FIGS. 7A and 7B show illustrative SEM images of a carbon nanotube array grown on a carbon fiber substrate at 1.4 torr.
Figure 7B:
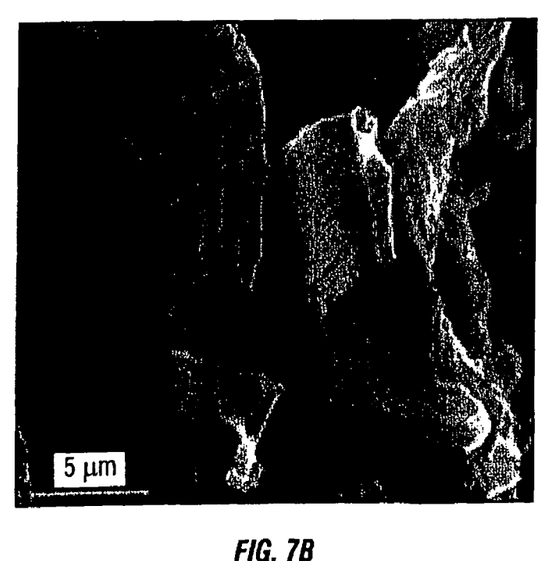

For growth on carbon fibers, catalyst deposition and carbon nanotube growth were performed similarly to that described in Example 1. For growth on carbon fibers, the catalyst layer and the alumina overlayer were deposited on to a weave of carbon fiber mesh material. As a result of the carbon fiber weave, some portions of the carbon fibers were coated as described above, whereas other sections under the weave remained uncoated. Growth of the carbon nanotubes occurred in a similar fashion to that described in Example 1 for carbon foil. FIGS. 7A and 7B show illustrative SEM images of a carbon nanotube array grown on a carbon fiber substrate at 1.4 torr. Region 701 in FIG. 7A having no coating of carbon nanotubes occurred as a result of this region of the carbon fiber being covered by the weave of the carbon fiber mesh when the catalyst and alumina layers were being coated. Furthermore, the SEM images showed that there was no residual alumina on the carbon fibers themselves, as evidenced by the lack of bright spots on the carbon fiber surface From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A carbon nanotube array, comprising:
   a substrate, wherein there is no catalyst immobilized on the substrate; and
   carbon nanotubes directly grown on the substrate without an intervening oxide layer between the substrate and a catalyst;
      wherein the carbon nanotubes are arranged as a vertically aligned carbon nanotube array on the substrate, and
      wherein the carbon nanotubes are covalently bonded to the substrate by a plurality of direct nanotube carbon-substrate covalent bonds.

2. The carbon nanotube array of claim 1, wherein the substrate is an electrical conductor.

3. The carbon nanotube array of claim 1, wherein the substrate is a carbon substrate.

4. The carbon nanotube array of claim 3, wherein the carbon substrate comprises a carbon foil.

5. The carbon nanotube array of claim 3, wherein the carbon substrate comprises carbon fibers.

6. The carbon nanotube array of claim 3, wherein the carbon substrate comprises diamond.

7. The carbon nanotube array of claim 1, wherein the substrate is selected from the group consisting of carbon, carbon fibers, carbon foil, graphite, diamond, nano-diamond, diamond-like carbon, glassy carbon, silicon, quartz, silicon carbide, non-metal carbides, metal carbides, binary carbides and metals.

8. The carbon nanotube array of claim 1, wherein the carbon nanotubes comprise single-wall carbon nanotubes.

9. A carbon nanotube array, comprising:
   a carbon substrate, wherein there is no catalyst immobilized on the carbon substrate; and carbon nanotubes directly grown on the carbon substrate without an intervening oxide layer between the carbon substrate and a catalyst;
  wherein the carbon nanotubes are arranged as a vertically aligned carbon nanotube array on the carbon substrate,
  wherein the carbon nanotubes are covalently bonded to the carbon substrate by a plurality of direct nanotube carbon-carbon substrate covalent bonds, and
  wherein the carbon substrate is selected from the group consisting of carbon foil, carbon fibers and diamond.

* * * * *